(12) United States Patent
Karan

(10) Patent No.: US 11,900,836 B2
(45) Date of Patent: Feb. 13, 2024

(54) METHOD FOR FORMING A LABEL WEB

(71) Applicant: Kenco Label & Tag Co., LLC, Milwaukee, WI (US)

(72) Inventor: Aharon A. Karan, Milwaukee, WI (US)

(73) Assignee: Kenco Label & Tag Co., LLC, Milwaukee, WI (US)

( * ) Notice: Subject to any disclaimer, the term of this patent is extended or adjusted under 35 U.S.C. 154(b) by 6 days.

(21) Appl. No.: 17/721,629

(22) Filed: Apr. 15, 2022

(65) Prior Publication Data

US 2022/0238046 A1 Jul. 28, 2022

Related U.S. Application Data

(62) Division of application No. 16/579,353, filed on Sep. 23, 2019, now Pat. No. 11,341,869.

(Continued)

(51) Int. Cl.
| | |
|---|---|
| *B32B 43/00* | (2006.01) |
| *G09F 3/10* | (2006.01) |
| *B31D 1/02* | (2006.01) |
| *B31D 1/00* | (2017.01) |
| *B65C 9/00* | (2006.01) |

(Continued)

(52) U.S. Cl.
CPC ............. *G09F 3/10* (2013.01); *B31D 1/0062* (2013.01); *B31D 1/021* (2013.01); *B31D 1/026* (2013.01); *B31D 1/027* (2013.01); *B65C 9/0006* (2013.01); *B29C 65/48* (2013.01); *B29C 65/50* (2013.01); *B31D 2201/02* (2013.01); *B32B 43/006* (2013.01); *G09F 3/02* (2013.01); *G09F 2003/023* (2013.01); *G09F 2003/0229* (2013.01); *G09F 2003/0257* (2013.01); *G09F 2003/0263* (2013.01); *Y10T 156/11* (2015.01); *Y10T 156/1168* (2015.01); *Y10T 156/1174* (2015.01); *Y10T 156/1195* (2015.01);

(Continued)

(58) Field of Classification Search
CPC ............. B32B 43/006; Y10T 156/1168; Y10T 156/1174; Y10T 156/1195; Y10T 156/1978; Y10T 156/1994; B29C 65/48; B29C 65/50; B31D 1/0062; B31D 1/021; B31D 1/026
See application file for complete search history.

(56) References Cited

U.S. PATENT DOCUMENTS

| | | |
|---|---|---|
| 3,869,333 A | 3/1975 | McMaster |
| 3,884,443 A | 5/1975 | McMaster |

(Continued)

*Primary Examiner* — Philip C Tucker
*Assistant Examiner* — Nickolas R Harm
(74) *Attorney, Agent, or Firm* — Boyle Fredrickson, S.C.

(57) ABSTRACT

A label web and method utilize a substrate, first and second longitudinally spaced label arrays each including two or more double-sided adhesive labels removably attached to the substrate, and a peelable protective covering web extending generally coextensive with the substrate. The label arrays and the peelable protective web are configured such that the peelable protective web is selectively removable to expose the first label array while remaining removably attached to the second label array, with both the first and second label arrays remaining removably attached to the substrate, to thereby facilitate removal of all labels in the first label array as a group while the peelable protective covering web remains in place over the second label array.

8 Claims, 3 Drawing Sheets

Related U.S. Application Data

(60) Provisional application No. 62/735,378, filed on Sep. 24, 2018.

(51) Int. Cl.
*G09F 3/02* (2006.01)
*B29C 65/50* (2006.01)
*B29C 65/48* (2006.01)

(52) U.S. Cl.
CPC .... *Y10T 156/1978* (2015.01); *Y10T 156/1994* (2015.01); *Y10T 428/1471* (2015.01)

(56) References Cited

U.S. PATENT DOCUMENTS

| | | |
|---|---|---|
| 4,950,517 A | 8/1990 | Loggins |
| 6,071,583 A | 6/2000 | Pomerantz |
| 6,403,188 B1 | 6/2002 | Donahue |
| 6,905,747 B2 * | 6/2005 | Auchter .................... G09F 3/10 428/40.1 |
| 7,709,071 B2 * | 5/2010 | Wong .................... G09F 3/0288 40/340 |
| 2002/0106471 A1 | 8/2002 | Kuo |
| 2003/0152732 A1 | 8/2003 | Donahue |
| 2005/0084641 A1 | 4/2005 | Downs |
| 2007/0114789 A1 * | 5/2007 | Morrish .................... B32B 7/06 283/107 |
| 2009/0075010 A1 * | 3/2009 | Flynn ........................ B32B 7/12 428/42.3 |
| 2014/0272233 A1 | 9/2014 | Downs |
| 2018/0009210 A1 * | 1/2018 | Liebl ........................ B32B 3/30 |

* cited by examiner

METHOD FOR FORMING A LABEL WEB

CROSS-REFERENCE TO RELATED APPLICATION

This application claims the benefit of U.S. Patent Application No. 62/735,378, filed on Sep. 24, 2018, and entitled "Label Web with Longitudinally-Spaced Arrays of Double-Sided Adhesive Labels," the content of which is incorporated herein by reference in its entirety, and is a divisional of application Ser. No. 16/579,353, filed Sep. 23, 2019.

FIELD OF THE INVENTION

This invention relates generally to adhesive labels, and more particularly to production and delivery of labels coated on both sides with a releasable adhesive that are used in a group of multiple labels for attaching objects to one another.

BACKGROUND OF THE INVENTION

There are many circumstances in which it is desirable to use a group of adhesive tabs or strips to attach one object to another. For example, tabs of single or double-sided tape individually torn from a roll are sometimes used for hanging a poster on a wall. Tabs of tape or adhesive strips are also sometimes used to attach the trailing end of a roll of paper or other material to a cylindrical cardboard core to facilitate winding a roll of the paper or other material about the core.

Sometimes multiple adhesive tabs or strips must be used at substantially the same time for securing the objects together. Having to individually tear the tabs or strips from a roll of single or double-sided tape can be undesirably time consuming and cumbersome. This is particularly true where groups of double-sided adhesive-coated tabs or strips are needed, because such tabs or strips often require the removal of individual backing and protective covering webs that keep the tabs from inadvertently sticking to themselves or the wrong surface.

It is desirable, therefore, to provide an improved form of double-sided adhesive tabs or strips that can be readily freed as a group from backing and protective covering webs. It is also desirable to provide such improved double-sided adhesive tabs or strips in a form that is amenable to use in high volume applications requiring effective and efficient application of groups of double-sided adhesive tabs or strips as part of manufacturing, shipping, or other operations.

BRIEF SUMMARY OF THE INVENTION

The invention provides such improvements through utilization of a label web and method incorporating a substrate, first and second longitudinally spaced label arrays each including two or more double-sided adhesive labels removably attached to the substrate, and a peelable protective covering web extending generally coextensive with the substrate. The label arrays and the peelable protective web are configured such that the peelable protective web is selectively removable to expose the first label array while remaining removably attached to the second label array, with both the first and second label arrays remaining removably attached to the substrate, to thereby facilitate removal of all labels in the first label array as a group while the peelable protective covering web remains in place over the second label array.

In one form of the invention, a label web, includes a substrate, first and second label arrays, and a peelable protective coating web. At least one of the first and second longitudinally spaced label arrays includes two or more double-sided adhesive labels removably attached to the substrate. The peelable protective covering web extends substantially coextensively with the substrate. The peelable protective covering web is removably attached to the first and second label arrays of double-sided adhesive labels in such a manner that the peelable protective covering web is selectively removable to expose the first label array while remaining removably attached to the top surface of the second label array. During removal of the peelable protective web from the first label array, both the first and second label arrays remaining removably attached to the substrate, to thereby facilitate removal of all labels in the first label array as a group, with the peelable protective covering web remaining in place over the second label array.

Some forms of the invention may further include a first layer of releasable adhesive disposed between the substrate and the label arrays, and a second layer of releasable adhesive disposed between the label arrays and the peelable protective covering web. A first layer of a release agent may be disposed between the first layer of adhesive and the substrate, and a second layer of release agent may be disposed between the second layer of adhesive and the peelable protective covering web. The layers of adhesive and release agent may be configured such that the releasable bond formed between the peelable protective covering and the label arrays has a lower peel strength than the releasable bond between formed between the label arrays and the substrate.

In some forms of the invention, the first and second label arrays may be identical. The delineation between the first and second label arrays may be defined by a single die cut. The label web may be formed into a roll with sequential first and second label arrays disposed in a longitudinal direction along the roll.

In a label web according to the invention, the substrate may define a longitudinal axis of the substrate extending generally in a feed direction of the label web, a transverse axis of the substrate extending generally perpendicularly to the longitudinal axis of the substrate, top and bottom surfaces of the substrate, leading, and trailing ends of the substrate, and first and second longitudinally extending edges of the substrate. The first and second longitudinally spaced label arrays of two or more double-sided adhesive labels may have bottom surfaces thereof removably attached to the top surface of the substrate. The peelable protective covering web may extend generally coextensively with the substrate and be removably attached to the top surfaces of the first and second label arrays of double-sided adhesive labels. The first and second label arrays may each define respective leading and trailing edges thereof, with the leading edge of the second label array being disposed longitudinally adjacent the trailing edge of the first label array to form a generally transversely extending delineation between the first and second label arrays. The peelable protective covering web may be selectively longitudinally detachable from the top surface of die first label array to the delineation between the first and second label arrays while remaining removably attached to the top surface of the second label array, with both the first and second label arrays remaining removably attached to the substrate, to thereby facilitate removal of all labels in the first label array as a group with the peelable protective covering web remaining in place over the second label array.

The invention may also take the form of a method for removing a group of double-sided releasable adhesive coated labels from a substrate, or a method for forming a label web in accordance with the invention.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the invention. In the drawings.

While the invention is described herein in connection with certain preferred embodiments, there is no intent to limit it to those embodiments. On the contrary, the intent is to cover all alternatives, modifications, and equivalents within the spirit and scope of the invention.

DETAILED DESCRIPTION OF THE INVENTION

Figure 1:
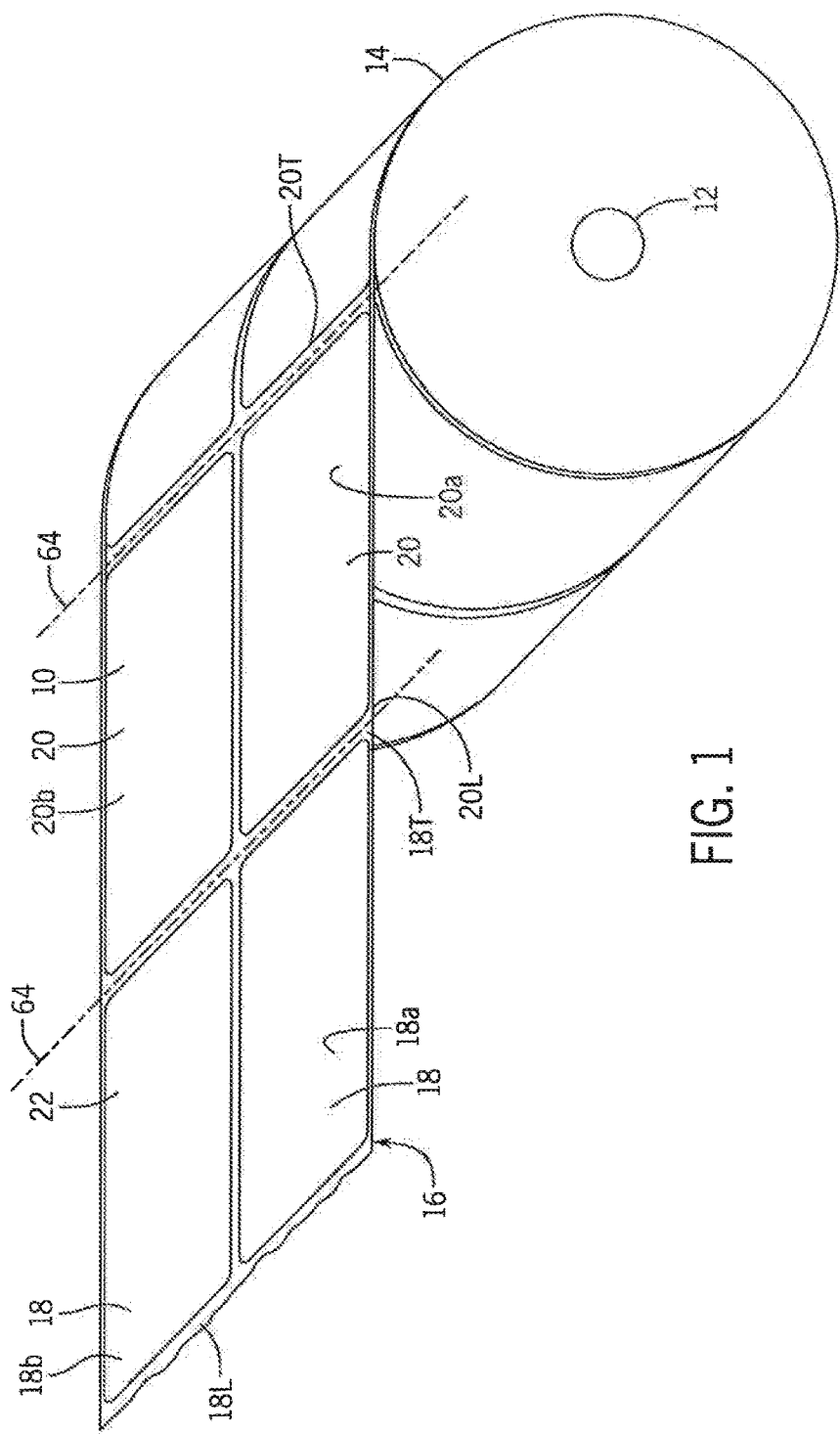
FIG. 1 is an isometric illustration of an exemplary embodiment of a label web in accordance with the invention.

FIG. 1 shows a first exemplary embodiment of a label web 10 wound around a core 12 to form a roll 14 of the label web 10.

As further illustrated in FIG. 1, the exemplary embodiment of the label web 10 includes a substrate 16, first and second longitudinally spaced label arrays 18,20, and a peelable protective coating web 22. In the exemplary embodiment, the first and second label arrays 18,20 are identical and each respectively include two double-sided adhesive labels 18a,18b,20a,20b that are removably attached to the substrate 16. The peelable protective covering web 22 extends substantially coextensively with the substrate 16.

As shown in FIG. 1, the peelable protective covering web 22 is removably attached to the first and second label arrays 18,20 of double-sided adhesive labels 18a,18b,20a,20b in such a manner that the peelable protective covering web 22 is selectively removable to expose the first label array 18 while remaining removably attached to the second label array 20. The label web 10 is further configured such that during removal of the peelable protective web 22 from the first label array 18, both the first and second label arrays 18,20 remain removably attached to the substrate 16, to thereby facilitate removal of both labels 18a,18b of the first label array 18 as a group with the peelable protective covering web 22 remaining in place over the second label array 20.

Figure 2:
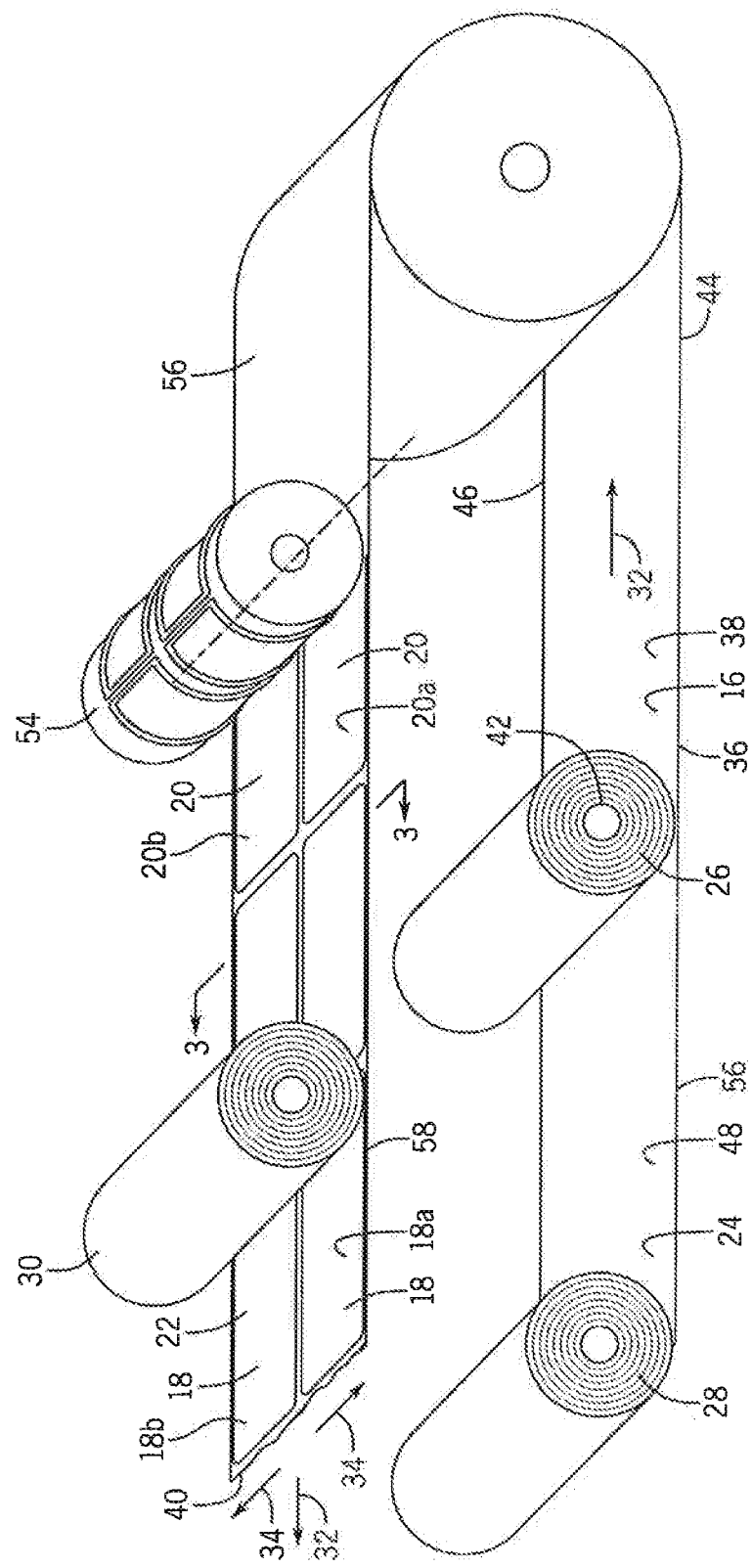
FIG. 2 is a schematic isometric illustration of an apparatus and method for forming the label web of FIG. 1.

FIG. 2 is a schematic illustration of a method for forming the exemplary embodiment of the label web 10 by attaching a web of label material 24 to the substrate 16, cutting the web of label material 24 to form the first and second label arrays 18,20, and subsequent longitudinally disposed label arrays, and then attaching the peelable protective covering 22 on top of the cut web of label material 24. In the method illustrated in FIG. 2, the substrate 16, the web of label material 24 and the peelable protective covering 22 are all supplied from respective supply rolls 26,28,30, and are coiled onto the core 12 (shown in FIG. 1) to form a completed roll 14 of the label web 10.

The substrate 16 defines a longitudinal axis 32 of the substrate 16 extending generally in a feed direction of the label web 10, a transverse axis 34 of the substrate 16 extending generally perpendicularly to the longitudinal axis of the substrate 16, top and bottom surfaces 36,38 of the substrate 16, leading and trailing ends 40,42 of the substrate 16, and first and second longitudinally extending edges 44,46 of the substrate 16. The trailing end 42 of the substrate is attached to the core 12 of the roll 14 of the label web 10.

Figure 3:
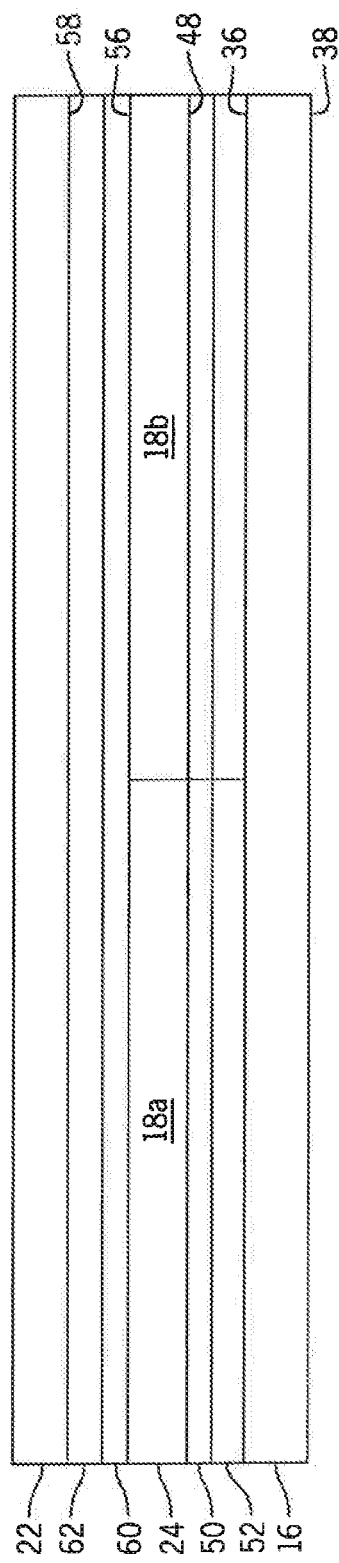
FIG. 3 is a transverse cross-sectional view, taken along line 3-3 in FIG. 2, illustrating the layered construction of the label web of FIG. 1.

As illustrated in FIGS. 2 and 3, a bottom surface 48 of the web of label material 24 is attached to the to the top surface 36 of the substrate 16 by a first layer of releasable adhesive 50 and a first layer of a release agent 52 disposed between the first layer of adhesive 50 and the top surface 36 of the substrate 16.

As shown in Fla 2, after the web of label material 24 is attached to the substrate 16, it passes through a cutting arrangement having a rotating cutting die 54 that forms the arrays 18,20 of labels 18a,18b,20a,20b in the web of label material 24.

As illustrated in FIGS. 2 and 3, a top surface 56 of the web of label material 24 is attached to a bottom surface 58 of the peelable protective covering web 22 by a second layer of releasable adhesive 60 and a second layer of a release agent 62 disposed between the second layer of adhesive 60 and the bottom surface 58 of the peelable protective covering web 22.

The layers of adhesive 50,60 and release agent 52,62 may be configured such that the releasable bond formed between the peelable protective covering 22 and the label arrays 18,20 has a lower peel strength than the releasable bond between formed between the label arrays 18,20 and the substrate 16, to thereby preclude inadvertently pulling the label arrays 18,20 away from the substrate 16 when the peelable protective web 22 is peeled back.

As shown in FIGS. 1 and 2, the web of label material 24 is cut to form the first and second longitudinally spaced label arrays 18,20 in such a manner that the first and second label arrays 18,20 each define respective leading and trailing edges 18L,18T,20L,20T thereof, with the leading edge 20L of the second label array 20 being disposed longitudinally adjacent the trailing edge 18T of the first label array 18 to form a series of generally transversely extending delineations 64 between adjacent successive label arrays 18,20, et sec.

With the label web 10 constructed in this manner, it will be appreciated that each successive group of double-sided adhesive labels forming an array may be uncovered by peeling the protective web 22 back to the respective delineation 64 at the trailing end of that array, and removing the group of labels forming that label array, without exposing the adhesive on the upper surface of the next label array.

The invention thus provides significant advantages over prior approaches to joining objects together with groups of adhesive tabs or strips.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For example, although the exemplary embodiments of the invention described herein are directed to a rolled embodiment of a label web, it is contemplated that in other embodiments the invention may be practiced with efficacy using sheets of substrate material rather than a continuous web of substrate material.

The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for removing a group of double-sided releasable adhesive coated labels from a substrate, the method comprising:
    attaching first and second longitudinally spaced label arrays to a substrate, with at least one label array including two or more double-sided adhesive labels removably attached to the substrate;
    covering the label arrays with a peelable protective covering web extending coextensive with the substrate and removably attached to the first and second label arrays of double-sided adhesive labels in such a manner that the peelable protective covering web is selectively removable to expose the first label array while remaining removably attached to the top surface of the second label array, with both the first and second label arrays remaining removably attached to the substrate; and
    peeling away the protective covering web to expose only the first label array, to thereby facilitate removal of all labels in the first label array as a group with the peelable protective covering web remaining in place over the second label array.

2. A method for forming a label web, the method comprising:
    forming a substrate defining a longitudinal axis of the substrate extending in a feed direction of the label web, a transverse axis of the substrate extending perpendicularly to the longitudinal axis of the substrate, top and bottom surfaces of the substrate, leading and trailing ends of the substrate, and first and second longitudinally extending edges of the substrate;
    releasably attaching a web of label material to the top surface of the substrate;
    cutting the web of label material to form first and second longitudinally spaced label arrays in such a manner that the first and second label arrays each define respective leading and trailing edges thereof, with the leading edge of the second label array being disposed longitudinally adjacent the trailing edge of the first label array to form a transversely extending delineation between the first and second label arrays; and
    releasably attaching a peelable protective covering web, extending coextensive with the substrate, to the layer of the web of label material defining the cut first and second label arrays in such a manner that the peelable protective covering web is selectively longitudinally detachable from the first label array to the delineation between the first and second label arrays while remaining removably attached to the second label array, with both the first and second label arrays remaining removably attached to the substrate, to thereby facilitate removal of all labels in the first label array as a group with the peelable protective covering web remaining in place over the second label array.

3. The method of claim 2, further comprising applying a first layer of releasable adhesive between the substrate and the label arrays, and a second layer of releasable adhesive between the label arrays and the peelable protective covering web.

4. The method of claim 3, further comprising applying a first layer of a release agent between the first layer of adhesive and the substrate, and applying a second layer of release agent between the second layer of adhesive and the peelable protective covering web.

5. The method of claim 4, further comprising configuring the layers of adhesive and release agent in such a manner that a releasable bond formed between the peelable protective covering and the label arrays has a lower peel strength than a releasable bond between formed between the label arrays and the substrate.

6. The method of claim 2, further comprising cutting the web of label material in such a manner that the first and second label arrays are identical.

7. The method of claim 2, further comprising forming the delineation between the first and second label arrays with a single die cut.

8. The method of claim 2, further comprising forming the label web as a roll with sequential first and second label arrays disposed in a longitudinal direction along the rolled label web.

* * * * *